Sept. 10, 1940.  B. CATER  2,214,161

DEVICE FOR GUIDANCE IN PARKING TRAILERS

Filed Dec. 2, 1938  2 Sheets-Sheet 1

INVENTOR
BARTON CATER
BY
HARRIS, KIECH, FOSTER & HARRIS
*Clarence F. Kiech*
FOR THE FIRM
ATTORNEYS Sept. 10, 1940.                B. CATER                    2,214,161
              DEVICE FOR GUIDANCE IN PARKING TRAILERS
                    Filed Dec. 2, 1938          2 Sheets-Sheet 2
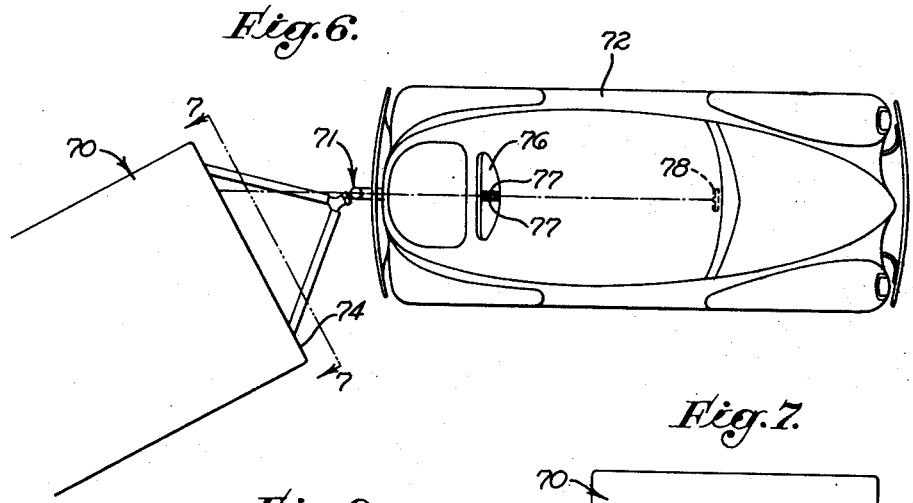
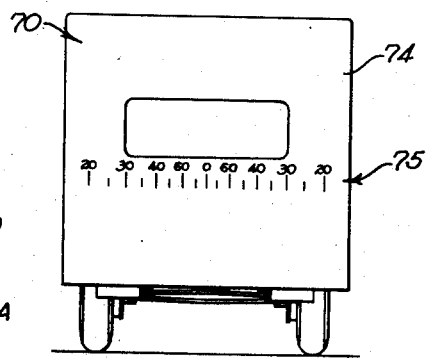
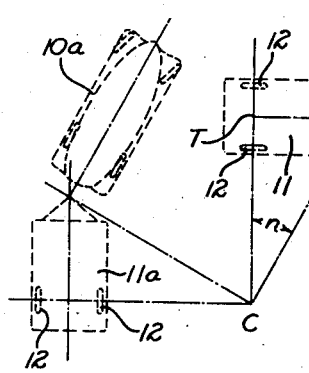
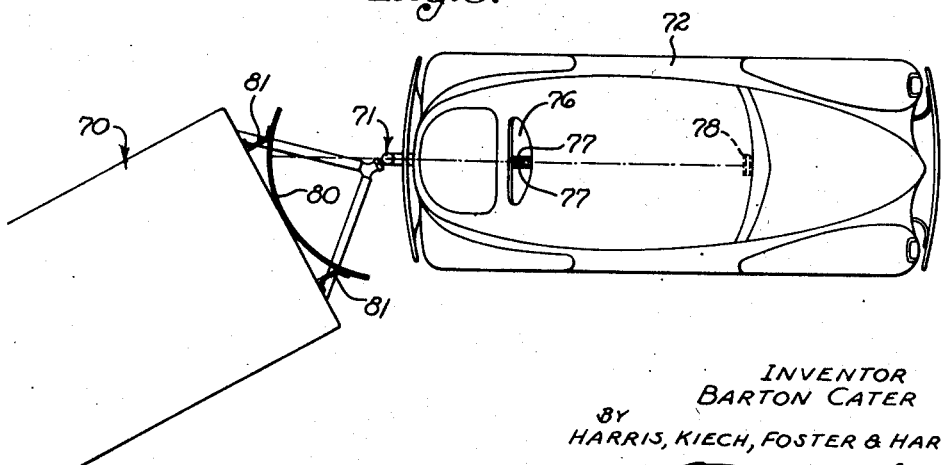
INVENTOR
BARTON CATER
BY
HARRIS, KIECH, FOSTER & HARRIS
ATTORNEYS Patented Sept. 10, 1940

2,214,161

UNITED STATES PATENT OFFICE 2,214,161

DEVICE FOR GUIDANCE IN PARKING TRAILERS

Barton Cater, Whittier, Calif.

Application December 2, 1938, Serial No. 243,569

5 Claims. (Cl. 116—28)

My invention relates to aids for maneuvering vehicles, with special reference to automobile trailers, and is directed specifically to means for guiding the driver of an automotive vehicle in backing a trailer with changing direction into a parking position. It will be apparent that the underlying principles may be applied to the maneuvering of all types of trailers, including four wheel trailers in tandem and two wheel semi-trailers in tandem. For the purpose of the present disclosure, however, I elect to describe the invention as applied to aids for parking two wheel trailers of the most numerous type, no limitations being implied by my election.

In the usual parking of a pleasure trailer in a trailer camp or of an industrial trailer at a shipping platform, the required parking position of the trailer is at right angles to the road position of the trailer. To back the trailer into such parking position, it is necessary to place the leading automotive vehicle at a disposition diverging from the normal tandem alignment of the two vehicles. The procedure is difficult for a number of reasons. In the first place, it is difficult to estimate the required angle of divergence for the two vehicles; in the second place, small but important changes in the angle of divergence while the trailer is moving backward are not readily apparent to the driver; and, finally, there is a source of confusion in the fact that in maintaining a desired angle of divergence while backing up, it is necessary to turn the steering wheel in directions contrary to normal driving habits.

Because of these considerations, proficiency in parking trailers is difficult to attain and ordinarily is attained only at the cost of inefficiency over a protracted learning period. Since pleasure trailers are ordinarily used only occasionally, most of their owners experience considerable difficulty in parking and fail to understand the nature of the factors involved.

The general object of my invention is to provide an aid that will make proficiency in such parking readily attainable. In achieving this object, one of my more specific objects is to provide a simple but accurate means for initially ascertaining the angle of divergence required for a given backing maneuver, and a second specific object is to provide means to indicate relatively small departures from that angle of divergence in the course of the backward movement. An advantage of my invention following from the accomplishment of these objects is that since the driver is relieved of any apprehension about the correct angle of divergence and since he is promptly notified of any minor departure therefrom, the driver is free to concentrate on the manipulation of the steering wheel. In the normal use of the preferred forms of my invention, the mental effort on the part of the driver is reduced to the governing of the front wheels of the automotive vehicle in accordance with changes in a readily observable means for indicating the instant angle between the two vehicles.

One object of the present disclosure is to simplify the matter of ascertaining the radius of curvature in the path of the trailer necessary to approach a given parking space from a given position, and a feature of my invention is that the means for indicating the angle of divergence between the two vehicles may be calibrated in terms of such radius of curvature.

The above and other objects and advantages of my invention will be apparent in the course of the following detailed description taken with the accompanying drawings.

In the drawings:

Fig. 6 is a schematic view in plan of an automobile and trailer equipped with a third form of my invention;

Fig. 7 is a front elevation of the trailer taken as indicated by the line 7—7 of Fig. 6;

Fig. 8 is a view similar to Fig. 6 showing a slight modification of the form of the invention shown in Fig. 6; and Fig. 9 is a diagram indicating the relationship between the angle of divergence between the two vehicles and the radius of the path described by the trailer when such angle is maintained.

An understanding of my invention may be advantageously approached by first considering Fig. 9. This figure depicts diagrammatically a situation in which an automobile 10 hitched to a trailer 11 at the hitch point H is disposed at the proper angle relative to the trailer to back the trailer into a required parking position 11a, the final position of the automobile being indicated at 10a. T is the mid-point of the axis of the two trailer wheels 12. TH, then, lies along the longitudinal axis of the trailer and HA is laid out to represent the longitudinal axis of the automobile 10. A perpendicular to the line HA at the point H will cut the extended axis of the trailer wheels 12 at the intersection point C. C will be the center about which the automobile and trailer will move in backing the trailer into the required parking position. The angle of divergence of the automobile 10 with respect to the trailer 11 may be defined as the angle $m$ between HA and TH extended. The location of the point C will depend upon the value of the angle $m$ and angle $m$ will always equal the angle $n$ at C formed by the lines TC and CH. Since $$\frac{TH}{TC}$$

is the tangent of the angle $n$, the value of the angle $m$ will vary with the ratio between TH, which may be conveniently termed the trailer length, and TC, which may be termed the radius of curvature of the trailer path in backing into the parking position. Since TH for a given trailer is a fixed value, the angle $m$ will vary inversely with the length of the radius TC.

It is apparent from the above analysis that the angles of divergence $m$ for selected radii of path curvature may be readily computed for a trailer of a given length. In practice I prefer to prepare a master logarithmic alignment chart from which the angles of divergence for trailers of various lengths for selected radii of path curvature may be readily derived.

I regard the selection of the line TC as the radius of path curvature as a distinctive feature of my invention not only because such selection results in a relatively simple mathematical presentation of the factors involved, but also because in my practice TC is the only unknown and may be readily estimated on the ground preliminary to a parking maneuver.

Figure 1:
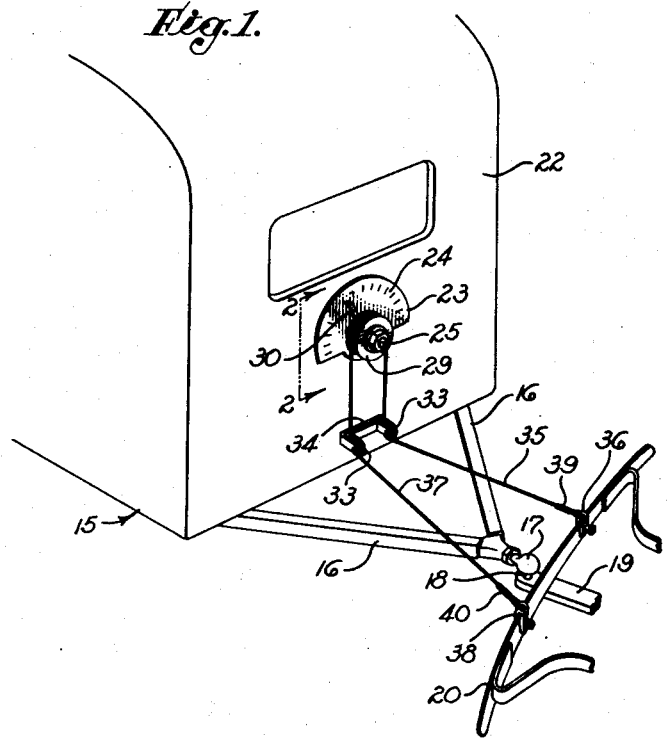
Fig. 1 shows in perspective the front end of a pleasure trailer with one form of my invention applied thereto.
Figure 2:
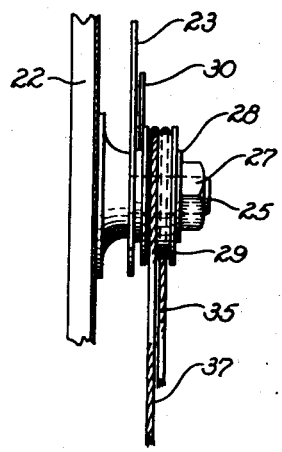
Fig. 2 is an enlarged side elevation of the angle indicator of Fig. 1 taken as indicated by the line 2—2 of Fig. 1.

The first embodiment of my invention is shown in Figs. 1 and 2. From a trailer generally designated by numeral 15 a pair of forwardly converging draft members 16 terminates in a coupling member 17, the coupling member engaging a complementary coupling member 18 on a draft bar 19 extending rearwardly from an automobile (not shown). Above the draft bar 19 is the rear bumper 20 of the automobile.

Mounted on the front wall 22 of the trailer in a position to be visible through the rear window of the automobile is a scale 23 having a plurality of index marks 24. A feature of my invention is that these indicia are evaluated in terms of TC expressed in feet or yards, in other words, selecter radii of trailer movement.

Extending forwardly from the scale 23 in concentric relation to the arcuate series of indicia 24 is a spindle 25. Rotatably secured on the spindle 25 by a suitable nut 27 and washer 28 is a rotary member or sheave 29 that carries a radially extending pointer 30 to traverse the series of indicia 24. Directly below the scale 23 on the front wall 22 of the trailer is a pair of pulleys 33 mounted in suitable bracket means 34. A cable 35 anchored to the sheave 29 and initially wrapped around the sheave in a clockwise direction passes under one of the pulleys 33 and is connected by a suitable fitting 36 to the bumper 20 to one side of the draft bar 19. In like manner a second cable 37 is secured by one end to the sheave 29 and initially wound therearound in a counter-clockwise direction and passing under the other pulley 33 is connected by a fitting 38 to the bumper 20 on the other side of the draft bar 19. Preferably the cables 35 and 37 are made, in effect, longitudinally yieldable by the insertion of helical springs 39 and 40 respectively between the cables and the fittings 36 and 38.

The adjustment of the arrangement described is such that when the trailer and automobile are 10 in normal road disposition aligned in a straight line, the pointer 30 will be at a central position corresponding to zero angle of divergence. Any departure from the normal alignment of the two vehicles swings the pointer 30 to one of the index marks 24 designating the radius of path curvature that will result from maintaining the corresponding angle of divergence in backing up the trailer. It is apparent, then, that to back the trailer into a given parking position, the driver need merely estimate the required radius of trailer movement, maneuver to bring the pointer to the corresponding index mark, and then, observing the pointer either directly or through his mirror, keep the pointer on the mark while backing up.

Figure 3:
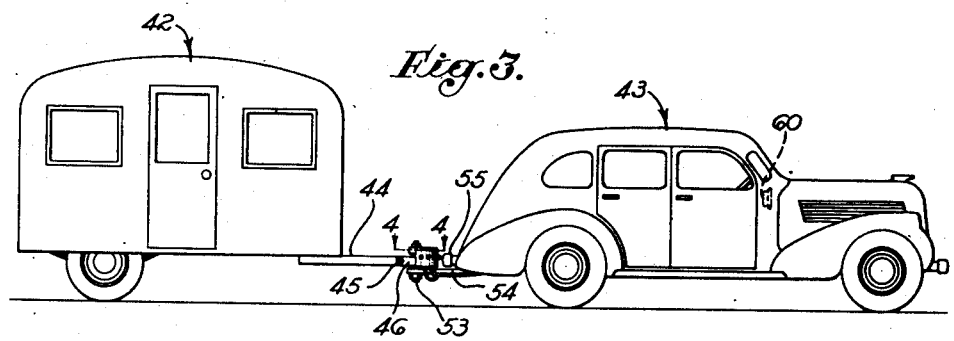
Fig. 3 is a side elevation of an automotive vehicle and a pleasure trailer hitched thereto with a second form of my invention associated with the trailer hitch.
Figures 4, 5:
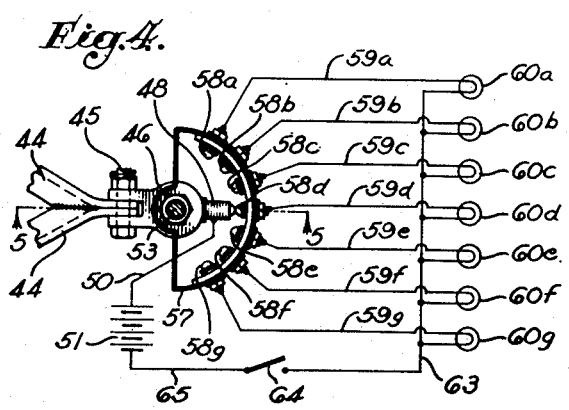
Fig. 4 is a horizontal section on an enlarged scale as indicated by the line 4—4 of Fig. 3.
Fig. 5 is a vertical section taken as indicated by the line 5—5 of Fig. 4.

In the second form of my invention shown in Figs. 3 to 5, I propose to provide a plurality of lamps at a location convenient for the driver of the automobile, for example, on the dashboard, each lamp representing a selected angle of divergence for selected radius of curvature for the trailer path and being energized by automatic means when the automobile is at the corresponding angle to the trailer. Fig. 3 shows a trailer, generally designated 42, drawn by an automobile, generally designated 43. The forwardly extending draft members 44 of the trailer are hingedly connected by a horizontal bolt 45 to a coupling member 46. A switch arm 48 mounted on the forward side of the coupling member 46 and insulated therefrom terminates in a switch contact 49 that is energized by a wire 50 from an electromotive means such as a battery 51. It will be noted that by virtue of this arrangement, the switch arm 48 will be held in alignment with the longitudinal axis of the trailer at all times.

The coupling member 46 is rotatably carried by a substantially vertical coupling spindle 53 that is in turn non-rotatably mounted on a draft bar 54 extending to the rear from the automobile 43 below the bumper 55. A switch housing 56 having an arcuate wall 57 concentric with the spindle 53 is fixedly attached to the upper end of the spindle and therefore has a constant position with respect to the automobile 43 but rotates with respect to the coupling member 46 as the angular relationship between the two vehicles varies. Mounted on the inner side of the arcuate wall 57 is a series of contacts 58 connected to corresponding wires 59 that in turn are connected to indicator lamps 60 on the dash of the car. As indicated in Fig. 4, there may be, for example, seven contacts 58a to 58g, corresponding wires 59a to 59g, and corresponding lamps 60a to 60g. To complete the circuits, each of the lamps 60 is connected to a wire 63 leading to a master switch 64 that in turn is connected through a wire 65 to the battery 51.

In using this second form of my invention, the driver determines or estimates the radius of curvature through which the trailer must move to reach the desired parking position, for example, a curvature corresponding to the indicator lamp 60f. The driver will then close the master switch 64 and maneuver the car to an angle that brings the switch arm 48 opposite the switch contact 58f to energize the lamp 60f. The driver will then back up his car, manipulating his steering wheel as required to keep the lamp 60f energized.

In the third form of my invention I dispense with moving parts and rely solely upon a simple but accurate sighting procedure. Fig. 6 shows a trailer 70 hitched by a suitable coupling means 71 to an automobile 72. Painted on the front face 74 of the trailer, as best shown in Fig. 7, is a divergence scale generally designated 75, the scale being within the vertical range of the rear window 76 of the automobile. Somewhere toward the rear of the automobile, preferably associated with the rear window 76, is some form of reference suitable for sighting against the scale 75. For example, such reference may comprise simply a pair of spaced vertical bars 77 painted on the rear window 76. The two reference bars 77 are symmetrical with respect to a vertical plane through the axis of the automobile 72 and the rear view mirror 78 of the car is bisected by that plane. If desired, the mirror 78 may be provided with a vertical hairline to indicate the line of intersection with the plane.

In using this form of my invention the driver of the car observing through the mirror 78 merely keeps the reference bars 77 aligned with the required index marks in the scale 75 as he backs up the trailer.

Fig. 8 is similar to Fig. 7, corresponding numerals indicating corresponding parts. The purpose of this figure is to suggest that instead of placing the scale 75 on the front face 74 of the trailer, I may employ an arcuate band 80 to receive the index marks, the band being attached to the trailer by suitable means such as legs 81. If such a band 80 is concentric to the axis of the coupling means 71, equal scale distances will indicate equal changes in the angle of divergence of the automobile with respect to the trailer.

For the purpose of this disclosure and to illustrate the principles involved, I have described selected forms of my invention in specific detail. The embodiments described will suggest to those skilled in the art various changes and modifications that do not depart from my underlying concept, and I reserve the right to all such changes and modifications that properly come within the scope of my appended claims.

I claim as my invention:

1. The combination with an automotive vehicle and a trailer hitched thereto, of means to guide the driver of said automotive vehicle in backing the trailer by a curved path into a parking space, said guide means comprising: one or more fixed index marks on the front of the trailer corresponding to one or more radii of path curvature, said index marks being positioned to be visible to the driver; a pointer on the trailer positioned to cooperate with said index marker marks; and a pair of flexible members operatively connecting said pointer with the automotive vehicle on opposite sides of the point at which the automotive vehicle is hitched to the trailer.

2. A combination as set forth in claim 1 in which said flexible members are longitudinally yieldable and in mutually opposed tension.

3. The combination with an automotive vehicle and a trailer hitched thereto, of means to guide the driver of said automotive vehicle in backing the trailer by a curved path into a parking space, said guide means comprising: a fixed scale on the front of the trailer in a position to be visible to the driver, said scale having one or more index marks corresponding to one or more radii of path curvature; a pointer pivotally mounted on the front of the trailer to swing across said scale; a cable operatively connected to said pointer to move the pointer in one direction; and a cable operatively connected to said pointer to move the pointer in the opposite direction, said cables being connected to the opposite sides of said automotive vehicle, whereby when the pointer registers with an index mark on said scale while the trailer is being backed up, the trailer describes a circle having the corresponding diameter.

4. The combination with an automotive vehicle and a trailer vehicle hitched thereto, of means to guide the driver of the automotive vehicle in backing the trailer vehicle by an arcuate path into a parking space, said means comprising: a scale on the front of the trailer vehicle within the field of vision of the driver; a pointer on the front of the trailer vehicle positioned to traverse said scale; and means operatively connecting said pointer with the automotive vehicle to cause the pointer to shift with changes in the angular relationship of the two vehicles, said scale having a plurality of index marks with the radius of path curvature for each index mark shown on the scale, whereby the driver may back the trailer into a given parking position by selecting a radius of path curvature on the scale, stepping off the radius on the ground to locate a corresponding starting position for backing the trailer, maneuvering the trailer into said starting position with said pointer registering with said selected index mark, and then backing the trailer while maintaining said pointer on said selected index mark.

5. A combination as set forth in claim 3 in which said scale has a plurality of index marks with the radius of path curvature for each index mark shown on the scale, whereby the driver may without difficulty back the trailer into a given parking position by selecting a radius of path curvature on the scale, stepping off the radius on the ground to locate a corresponding starting position for backing the trailer, maneuvering the trailer into said starting position with said pointer registering with said selected index mark, and then backing the trailer while maintaining said pointer on said selected index mark.

BARTON CATER.

CERTIFICATE OF CORRECTION.

Patent No. 2,214,161.  September 10, 1940.

BARTON CATER.

It is hereby certified that error appears in the printed specification of the above numbered patent requiring correction as follows: Page 2, first column, line 59-60, for the word "selecter" read --selected--; page 3, first column, line 61, claim 1, for "marker" read --mark or--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.